(12) United States Patent
Saunders et al.

(10) Patent No.: US 7,046,158 B2
(45) Date of Patent: May 16, 2006

(54) METHOD AND APPARATUS FOR SENSING SEAT OCCUPANCY

(76) Inventors: Darrel Saunders, 11341-122 Street, Edmonton, Alberta (CA) T5M 0B6; Lynn Johner, 12411 Jasper Avenue, Edmonton, Alberta (CA) T5M 3K9; Petr Musilek, 3339 118 Street N.W., Edmonton, Alberta (CA) T6J 3J5

( * ) Notice: Subject to any disclaimer, the term of this patent is extended or adjusted under 35 U.S.C. 154(b) by 328 days.

(21) Appl. No.: 10/249,527

(22) Filed: Apr. 16, 2003

(65) Prior Publication Data

US 2003/0196495 A1    Oct. 23, 2003

Related U.S. Application Data

(60) Provisional application No. 60/373,312, filed on Apr. 17, 2002.

(51) Int. Cl.
*G08B 21/00* (2006.01)
*B60R 21/32* (2006.01)
*B60R 22/00* (2006.01)
*B60R 28/00* (2006.01)
*G01D 7/00* (2006.01)

(52) U.S. Cl. ............ 340/666; 340/665; 340/667; 340/426.1; 73/862.041; 73/862.042; 73/862.043; 701/45; 701/46; 701/47; 701/48; 701/49; 280/735; 180/721; 180/272; 180/273

(58) Field of Classification Search ........ 340/665–667, 340/426.1; 280/735; 701/45–49; 180/271–273; 177/177; 73/862, 862.041, 862.042, 862.043
See application file for complete search history.

(56) References Cited

U.S. PATENT DOCUMENTS

| 4,738,325 A | * | 4/1988 | Bullivant et al. .... 177/210 EM |
|---|---|---|---|
| 5,232,243 A | | 8/1993 | Blackburn et al. |
| 5,541,591 A | | 7/1996 | Bush |
| 5,570,903 A | | 11/1996 | Meister et al. |
| 5,971,432 A | | 10/1999 | Gagnon et al. |
| 6,081,757 A | | 6/2000 | Breed et al. |
| 6,088,640 A | | 7/2000 | Breed |
| 6,101,436 A | | 8/2000 | Fortune et al. |
| 6,116,639 A | | 9/2000 | Breed et al. |
| 6,129,168 A | | 10/2000 | Lotito et al. |
| 6,134,492 A | | 10/2000 | Breed et al. |
| 6,138,067 A | | 10/2000 | Cobb et al. |

(Continued)

FOREIGN PATENT DOCUMENTS

DE    199 47 733 A1    8/2001

(Continued)

*Primary Examiner*—Jeffery Hofsass
*Assistant Examiner*—Lam Pham
(74) *Attorney, Agent, or Firm*—Daryl W. Schnurr

(57) ABSTRACT

Method and apparatus for identifying and categorizing the weight and characteristics of the occupant currently occupying a vehicle seat. The method for identifying and categorizing the occupant or object involves measuring the deflection of the upper surface of the seat cushion at one or more points due to compression of the cushion produced by the weight distribution of the occupant. The system contains multiple sensor/emitter pairs for detecting the deflection. The system also includes a sensor to measure ambient temperature, preferably for temperature compensation due to the effects extreme temperatures may have on the compression properties of the seat cushion material and sensor/emitter pairs. A system processor interprets the data acquired by the sensors, and utilizes an algorithm and training tables to output a control signal indicative of the categorization of the occupant or object.

29 Claims, 9 Drawing Sheets

U.S. PATENT DOCUMENTS

| | | |
|---|---|---|
| 6,141,432 A | 10/2000 | Breed et al. |
| 6,168,198 B1 | 1/2001 | Breed et al. |
| 6,186,537 B1 | 2/2001 | Breed et al. |
| 6,220,627 B1 | 4/2001 | Stanley |
| 6,234,519 B1 | 5/2001 | Breed |
| 6,234,520 B1 | 5/2001 | Breed et al. |
| 6,242,701 B1 | 6/2001 | Breed et al. |
| 6,253,134 B1 | 6/2001 | Breed et al. |
| RE37,260 E | 7/2001 | Varga et al. |
| 6,254,127 B1 | 7/2001 | Breed et al. |
| 6,270,116 B1 | 8/2001 | Breed et al. |
| 6,279,946 B1 | 8/2001 | Johnson et al. |
| 6,283,503 B1 | 9/2001 | Breed et al. |
| 6,324,453 B1 | 11/2001 | Breed et al. |
| 6,325,414 B1 | 12/2001 | Breed et al. |
| 6,330,501 B1 | 12/2001 | Breed et al. |
| 6,331,014 B1 | 12/2001 | Breed |
| 6,353,394 B1 | 3/2002 | Maeda et al. |
| 6,393,133 B1 | 5/2002 | Breed et al. |
| 6,397,136 B1 | 5/2002 | Breed et al. |
| 6,407,347 B1 | 6/2002 | Blakesley |
| 6,412,813 B1 | 7/2002 | Breed et al. |
| 6,416,080 B1 | 7/2002 | Gillis et al. |
| 6,422,595 B1 | 7/2002 | Breed et al. |
| 6,442,465 B1 | 8/2002 | Breed et al. |
| 6,442,504 B1 | 8/2002 | Breed et al. |
| 6,445,988 B1 | 9/2002 | Breed et al. |
| 6,452,870 B1 | 9/2002 | Breed et al. |
| 6,476,514 B1 | 11/2002 | Schondorf |
| 6,529,809 B1 | 3/2003 | Breed et al. |
| 6,532,408 B1 | 3/2003 | Breed |
| 6,536,797 B1 | 3/2003 | Reich |
| 6,536,806 B1 | 3/2003 | Uematsu et al. |
| 6,609,054 B1 * | 8/2003 | Wallace ............... 701/45 |
| 6,662,138 B1 * | 12/2003 | Takafuji et al. ........ 702/173 |
| 2003/0196495 A1 | 10/2003 | Saunders et al. |
| 2003/0220766 A1 | 11/2003 | Saunders et al. |

FOREIGN PATENT DOCUMENTS

| | | |
|---|---|---|
| EP | 0 728 636 A1 | 8/1996 |
| WO | WO 95/24616 | 9/1995 |
| WO | WO 00/50856 | 8/2000 |
| WO | WO 01/85497 A1 | 11/2001 |

* cited by examiner

METHOD AND APPARATUS FOR SENSING SEAT OCCUPANCY

BACKGROUND OF THE INVENTION

This Application claims the benefit of U.S. Provisional Application No. 60/373312, filed Apr. 17, 2002.

BACKGROUND OF THE INVENTION

This invention generally relates to the field of automatic occupancy sensing systems for use in vehicle seats. More specifically, it relates to methods and apparatus employed to produce data corresponding to the weight and the weight distribution or compression pattern of the seat occupant and to gather and interpret the data by a computerized system.

The automotive airbag was designed to provide protection to passengers during vehicle collisions. Traditionally, the passenger-side airbag has been permanently ready to deploy in case of a collision involving front or side impact. However concerns about the impact on children and small adults have led to developments that may allow the driver or passenger to disengage the airbag by way of an on/off toggle or key switch. Because of its nature, i.e. operator/manual control, there is a chance of operator error by forgetting or neglecting to actuate the switch to the setting appropriate to the type of person occupying the passenger seat. The US National Vehicle Transportation and Safety Administration (NVHS) issued a Federal Motor Vehicle Safety Standard FMVSS-208, to combat the danger due to operator error and for other reasons. FMVSS-208 requires that 25% of all passenger vehicles produced in the United States, during and after 2004, have an automatic airbag deployment suppression system. The automatic airbag deployment suppression system must determine the mode of airbag deployment to be either fully enabled or fully suppressed based on the current occupant of the seat. By 2008, the automatic airbag deployment suppression system must also control the rate and percentage of airbag deployment depending on the current occupant of the passenger seat and be present in 100% of all new vehicles produced or sold in the United States.

Several patents cited with this application illustrate attempts by others to sense whether the occupant in the passenger seat is an adult above a certain weight or not and provide a deactivation signal to the air bag deployment control if not. Many of the prior patents show the use of multiple sensors in multiple locations to determine such things as whether the occupant is a human being, the location of the face and more elaborate determinations. Many systems found in the prior art are complex and expensive to fabricate, calibrate and to maintain.

SUMMARY OF THE INVENTION

The present application addresses the aforementioned problems of determining the appropriate deploying of airbags during vehicle collisions and the aforementioned requirements of FMVSS-208 by providing a novel method and apparatus for automatically sensing occupancy in a vehicle seat.

The system of the present invention is capable of distinguishing between the different patterns created by different occupants and their various seating positions on the seat, such as weight distribution patterns. The system's preferred purpose, but not its sole purpose, is to read sensor signals, interpret the signals, and relay data via the system processor to other vehicle management systems. For instance, another vehicle management system, that is not part of this invention, will determine the mode of the passenger-side airbag deployment system based on measured characteristics of the current seat occupant made by the system of the present invention.

In the present invention, a method and apparatus is provided for identifying and categorizing the weight and weight distribution characteristics (e.g., distribution or compression pattern) of the occupant occupying a seat in a vehicle. The method and apparatus of the present invention is embodied in a system that identifies and categorizes the occupant load placed on the seating surface or cushion of a seat—commonly referred to in the seating industry as a "seat bun". This is done, whether the occupant load is human or otherwise and returns information that is useful for the management of various vehicle sub-systems.

The method for identifying and categorizing the occupant comprises measuring the deflection of the upper surface of the seat bun at multiple points due to compression as caused by the occupant. In its simplest embodiment, a single sensor made up of a sensor/emitter pair (e.g., a Hall-effect sensor) can be used to measure the load weight. However, in order to include the ability to measure the weight distribution pattern, the system utilizes multiple sensor/emitter pairs for detecting this deflection. In one embodiment, the unique sensor/emitter pairs detect the change in the distance between the upper and lower sections or surfaces of the seat bun at multiple points when the load of an occupant is applied. In another embodiment, a two dimensional array of deflection sensors are used. The deflection sensors include magnetic field emitters and field sensor pairs. The sensors are physically connected to a flat substrate beneath the seat cushion. The sensors are responsive to a weight load placed on the seat cushion as the distance between the emitters and the sensors varies due to load compression of the cushion against the substrate. The use of multiple sensors in a predetermined array causes sensors to provide signals that can be analyzed in the form of a three-dimensional topographical map indicative of the load. A processor receives the sensor output signals, to determine the occupant's weight and its weight distribution pattern and to provide data useful in the control of other vehicle sub-systems.

The processor may use a neural network simulation method to analyze the data gathered through the sensors and for generating and outputting data useful to the control of other vehicle sub-systems. Alternatively, a neural network or other predictive learning or training method may be used to generate tables of variable factors unique to the particular seat configuration and construction. The on board system processor can then utilize the tables in applying its analysis algorithm to the sensor readings in order to generate meaningful output data to the vehicle control sub-systems.

The invention may also include an ambient air temperature sensor to measure the temperature within the vehicle. The information from the temperature sensor is used to compensate for the effect that a severe temperature may have on the response characteristics of the sensors and the compression characteristics of the seat cushion material.

It is a preferred object of the present invention to supply a vehicle sub-system with information that can be used to control the enablement or disablement of the airbag deployment sub-system for associated airbags.

It is a preferred object of the present invention to supply a vehicle sub-system with information that can be used to control the airbag deployment sub-system for full deployment, full suppression, or to any predetermined percentage of deployment between the two extremes.

It is another preferred object of the present invention to determine occupant weight, which is useful information for controlling vehicle sub-systems including, but not limited to, brake biasing, suspension valving, or abandoned occupants warning.

It is yet another preferred object of the present invention to determine seat status, that is, whether it is empty or occupied by a human or by non-human objects, which is useful information for controlling vehicle sub-systems including, but not limited to, seat belt indicators and related or ancillary warning systems.

Broadly stated, one aspect of the apparatus of the present invention includes a sensor means mounted in a seat bun, and a processor. The seat bun forms a portion of the seating cushion for a vehicle occupant's seat and has a substantially horizontal upper surface portion and a lower portion. The sensor means has first and second relatively movable parts aligned for relative movement along a path that is substantially perpendicular or transverse to the seat bun surface. The first part is mounted within the seat bun and spaced below the upper surface, while the second part is mounted so as to be spaced below the first part. The sensor means is operative to produce signals indicative of the distance between the first and second parts and the processor receives the sensor signals and interprets the signals to produce an output that indicates the presence of a properly classified occupant in the seat.

Further objects, features, and advantages of the invention will become apparent from a consideration of the following detailed description, when taken in connection with the accompanying drawings.

DETAILED DESCRIPTION

Figure 1:
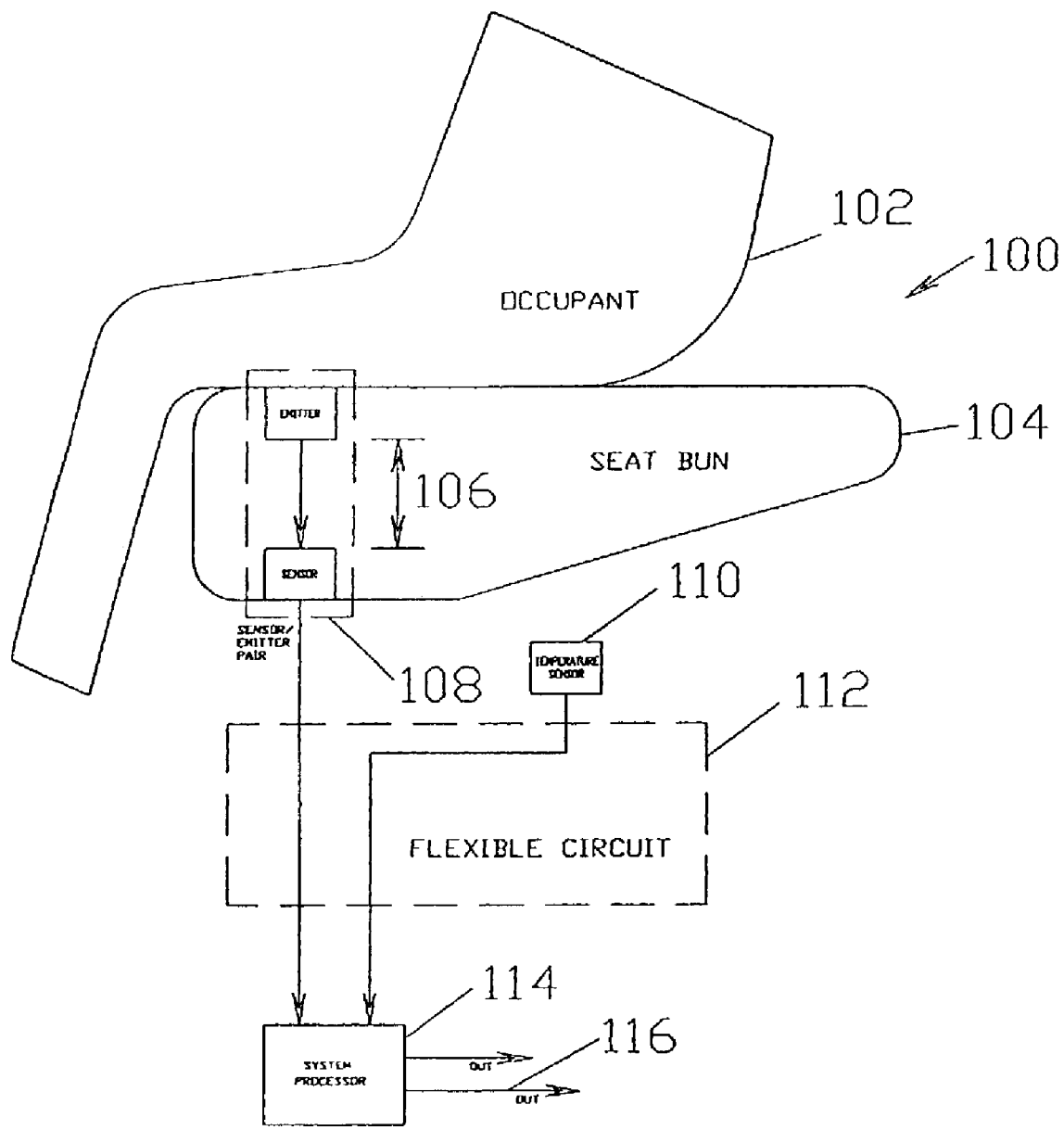
FIG. 1 is a block diagram characteristic of the system and the connections between its components.

In FIG. 1, an occupancy detection system (100) is shown as one embodiment of the present invention. As shown, the system (100) includes a seat cushion or bun (104), which has at least one set of sensor/emitter pairs (108) mounted in it. With the presence of an occupant (102) on the seat bun (104), the distance (106) between the emitter and sensor elements changes due to compression of the seat bun (104). The sensor/emitter pairs (108) transmit the data reflective of the distance (106), through a flexible circuit layer (112) and to a system processor (114). A temperature sensor (110) is connected to the system processor (114) through the same flexible circuit (112) and is used to ascertain the ambient temperature in which the system (100) is operating for the purpose of temperature compensating the data (106) in non-standard or extreme ambient temperatures. Once the system processor (114) has analyzed the temperature-compensated data and produced the desired outputs, the output signal (116) is sent to external sub-systems. For instance, for an output signal (116) having a "1" value, an airbag deployment control system can use the information to enable deployment of an associated airbag in the event of a collision. Conversely, if the output (116) is "0" value, an airbag deployment control system can use the information to suppress deployment of or disable an associated airbag in the event of a collision. Other variations of the output (116), i.e. output of "0.5", could be used to provide 50% or some other fractional deployment power applied to an associated airbag.

Figure 2:
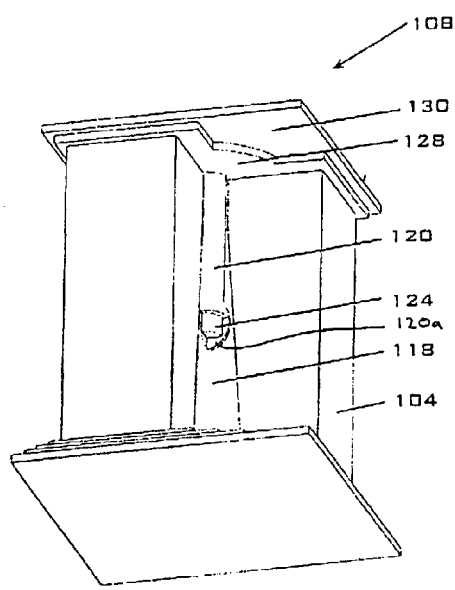
FIG. 2 is a perspective cutaway view of the emitter portion of one embodiment of a single sensor/emitter pair assembled in the seat bun.
Figure 3:
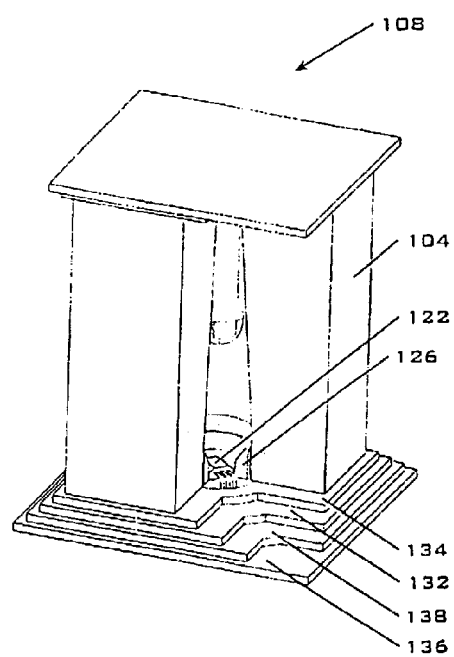
FIG. 3 is a perspective cutaway view showing the sensor portion of the embodiment of a single sensor/emitter pair shown in FIG. 1.

Referring to FIGS. 2 and 3, separate cutaway views are provided of a single sensor/emitter pair (108). The seat bun (104) is provided with a hole (118) having its longitudinal axis extending transverse to the upper surface of the seat bun (104). The hole (118) is provided to allow for assembly of the sensor/emitter pair (108) into the seat bun. The hole (118) is preferably tapered along its axis with the upper opening smaller than the lower opening.

The sensor/emitter pair (108) includes a magnetic field emitter (120) and a magnetic field sensor (122). The emitter (120) comprises a molded rubber probe (120a) containing a magnet (124). The emitter probe (120a) functions to support and align the magnet (124) with the center of the hole (118) and thus with the center of the sensor (122) that is mounted directly below the emitter (120). The emitter probe (120a) being secured and extending from the top of the hole ensures that the magnet (124) remains at a fixed distance from the top of the hole (118) when no load is applied to the surface of the seat.

In FIG. 3, sensor element (122) is a ratio-metric or linear Hall effect sensor. That is, as the magnet (124) is moved towards the sensor (122), a stronger magnetic field is applied to the sensor (122), which responsively outputs a signal indicative of it sensing the increase in flux density. Likewise, as the magnet (124) is moved away from the sensor (122), the sensor outputs a signal indicative of it sensing the corresponding decrease in flux density.

In the event that a large weight or force were applied to a single sensor/emitter pair (108), it is likely that the emitter (120), without protection, would directly contact the sensor (122). Over the lifetime of a vehicle, repeated mechanical contact between the sensor (122) and the emitter (120) could damage either component. In FIG. 2, a molded rubber sensor guard element (126) is shown and employed to ensure that emitter (120) is prevented from directly contacting the sensor (122). In addition, the sensor guard (126) is shown as being formed to correspond to the surface of the magnet (124) in order to serve as an alignment ring that centers the emitter (120) over the sensor (122) during extreme compression of the seat bun (104).

During assembly, the emitter (120) is adhesively attached to a substrate or protective sheet (130) and inserted into the hole (118) in the seat bun (104). A double-sided adhesive layer (128) ensures the emitter (120) will not move from the upper surface of the seat bun (104). A protective sheet (130), for example a 0.005" Polyester film, also seals the system from any fluids that may spill onto the seat. The protective sheet (130) also serves to provide a smooth upper surface for the seat, over which a fabric or other outer material can be applied, to ensure that the level of comfort remains constant between similarly configured seats that are equipped with the system and those that are not so equipped.

In FIG. 3, the sensor (122) is shown mounted on a flexible circuit layer (132), preferably composed of silver or other conductive material traces printed onto or embedded in a sheet of insulated film, such as Polyamide. The flexible circuit layer (132) is attached to the lower surface of the seat bun (104) with a double-sided adhesive sheet or adhesive layer (134). A substrate (136) is adhered to the flexible circuit (132) with a double-sided adhesive sheet or adhesive layer (138). The substrate (136) provides a stable reference position for the sensor and seals the lower surface of the system, thereby protecting the circuit from being cut or punctured by sharp objects that may be present under the seat. Although adhesives are used in this description, it is recognized and anticipated that others may chose to use other mechanisms to attach the sensor elements to the seat cushion and have results similar to ours.

Figure 4A:
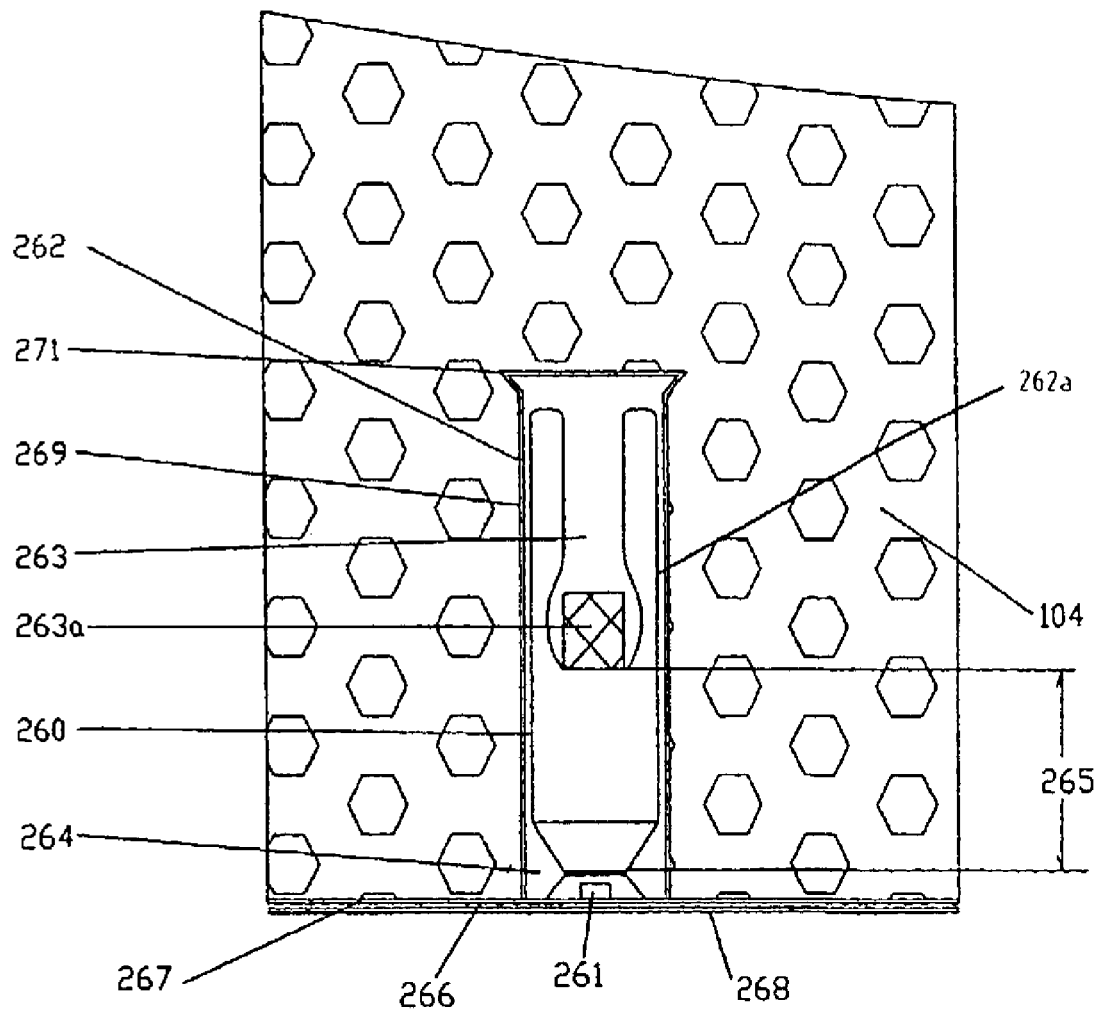
FIG. 4A is a cross-sectional view showing another embodiment of a single sensor/emitter pair within a collapsible housing.

In FIG. 4A, a second embodiment of a single sensor/emitter pair assembly (262) is shown in an alternative mounting in the seat bun (104). In this embodiment, the seat bun (104) is formed with a hole or cylindrical cavity (269) having its longitudinal axis aligned transverse or substantially perpendicular to the upper surface of the seat bun (104). A pre-assembled, one-piece cylinder shaped sensor/emitter pair assembly (262) is inserted as a single unit into the cavity (269). The sensor/emitter pair assembly (262) includes an emitter portion (263) and a sensor (261). The emitter portion (263) is a rubber-like support that contains and aligns a permanent magnet (263a) in a predetermined position with respect to the axis of the cavity (269). The emitter portion (263) also aligns the magnet (263a) with the center of the sensor (261). A molded rubber sensor guard (264) is located at the bottom of the assembly (262), adjacent to the sensor (261) in order to prevent damage to the sensor by direct contact with the magnet (263a) when a severe load is placed on the seat bun (104). The emitter portion (263) and the sensor guard (264) are joined by way of a substantially cylindrical housing wall (262a) that is formed of a compressible, rubber-like material, that has spring-like properties sufficient to restore the emitter to full height when no load is applied to the upper surface of the seat bun (104). The cylindrical housing wall (262a) therefore ensures that the magnet (263a) remains at the predetermined distance (265) from the sensor (261) under no load conditions. The predetermined distance (265) is selected such that the optimum performance of the sensor (261) is achieved over the range of movement between the elements along the defined linear path. The cylindrical housing wall (262a) is designed to compress as the seat bun (104) compresses, while maintaining a substantially cylindrical shape and not interfering with the movement of the emitter along its axial travel path. The equal compression allows for predictable movement of the magnet under known loads and the spring-like property allows for restoration of the magnet to a base or "zero" position under no load condition and thereby allows for true, accurate and predictable output from the sensor (261). The sensor (261) is a ratio-metric or linear Hall effect sensor. That is, as the magnet (263a) moves towards the sensor (261), it causes a stronger magnetic field flux that is sensed by the sensor (261).

The sensor/emitter assembly (262) is inserted into cavity (269) in the seat bun (104) from the bottom of the seat bun (104). The emitter/sensor assembly (262) has an outwardly extending retention lip (271) formed about the upper perimeter. The retention lip (271) allows for the sensor/emitter pair assembly (262) to be inserted into the cavity (269) but will prevent the accidental removal or movement once the insertion is complete and during the life of the seat bun (104). This configuration of the sensor/emitter pair assembly (262) will not interfere with the comfort level of the seat considering that the sensor/emitter pair assembly (262) does not extend to the upper surface of the seat bun (104).

The sensor (261) is directly mounted on and electrically connected to flexible circuit (267). The flexible circuit (267) can be further overlaid or laminated to a protective substrate (268), by way of a double-sided adhesive, an adhesive layer or other attachment mechanism that achieves results similar to our use of adhesives. The surface of the flexible circuit (267) that is in contact with the seat bun (104) also may be laminated with an adhesive layer (266) that will function as an additional way to affix the complete array to the seat bun (104).

Figure 4B:
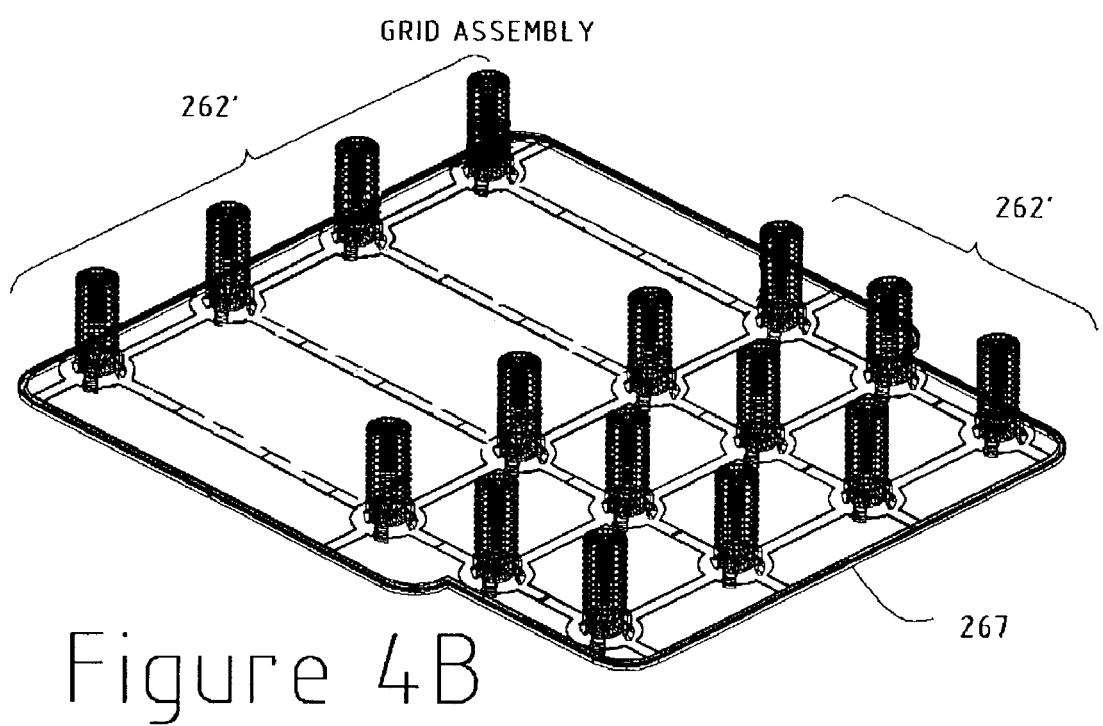
FIG. 4B is a perspective view of a plurality of sensor/emitter pairs, such as shown in FIG. 4A, mounted on a substrate.

The sensor/emitter pair assembly (262) may be mounted individually as shown in FIG. 4A or, in an array (262') corresponding to a predetermined sensing pattern for a given seat bun (104), as shown in FIG. 4B. In FIG. 4B, the entire array (262') is attached mechanically to flexible circuit (267).

Figure 5:
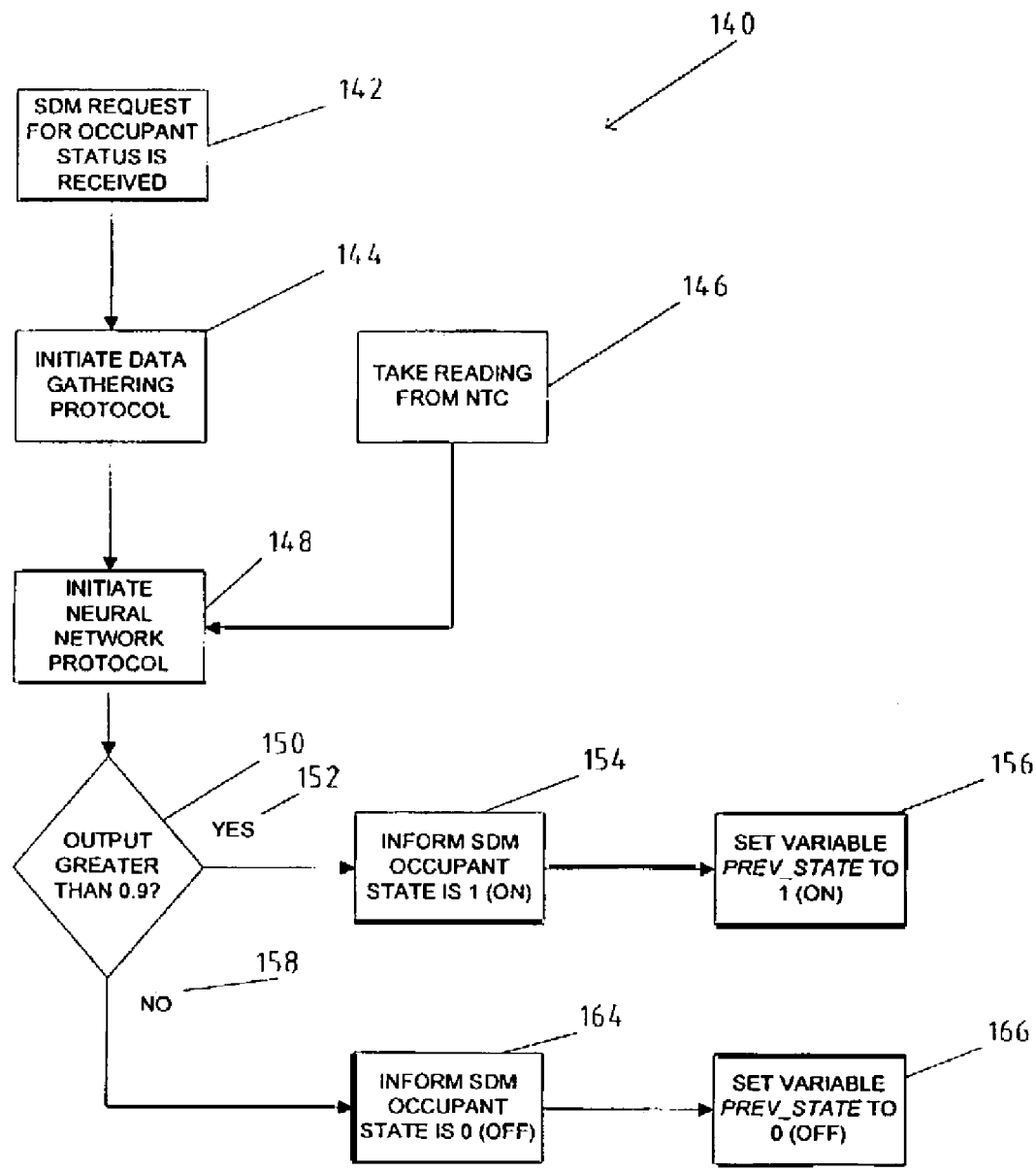
FIG. 5 is a flowchart comprising of a sequence of steps associated with the process used to identify and categorize the occupant sensed to be on the seat bun and indicate that information to a sensing and diagnostic module.

In FIG. 5, a flowchart shows a process (140) that is used to identify and categorize the occupant on the seat bun and indicate its category status to a vehicle sub-system, upon request. In this example, the vehicle sub-system making the request is sensing and diagnostic module for a vehicle airbag deployment system, referred to herein as an SDM. When the request for status is received at (142), the system processor (114) initiates its data gathering protocol step (144) by taking readings from the sensor/emitter pairs (108). Step (144) is further detailed below in reference to FIG. 6. If required, due to the expected physical property changes in the seat cushion material at extreme hot or cold temperatures and the resultant effects to the sensor readings, an ambient temperature reading is made at step (146). The sensor readings acquired in step (144) and ambient temperature reading acquired in step (146) are applied to an algorithm in step (148) that simulates a neural network protocol. Once the algorithm step (148) finishes processing the input data from the sensor readings and provides an output value, the output value is compared with a predetermined value at step (150) to determine if it is greater than the predetermined value. In this example, a "0.9" value is used as the predetermined value. However, depending on how one wishes to categorize the resultant output of the algorithm run in step 150, other values may be used. If the comparison at step (152) is determined to be in the affirmative, the system informs the SDM that the airbag deployment is to be enabled (154) by setting the output (116) at a "1" logic level. The "previous state" variable PREV_STATE is then set to a value of "1" (156), which indicates to the next request for status procedure (140) that the system's previous state was "1" or "ON". If the comparison at step (150) is in the negative (158), the system informs the SDM that the airbag deployment is to be suppressed at step (164). The variable PREV_STATE is then set to a value of "0" (166), which indicates to the next request for status procedure (140) that the system's previous state was "0" or "OFF".

Figure 6:
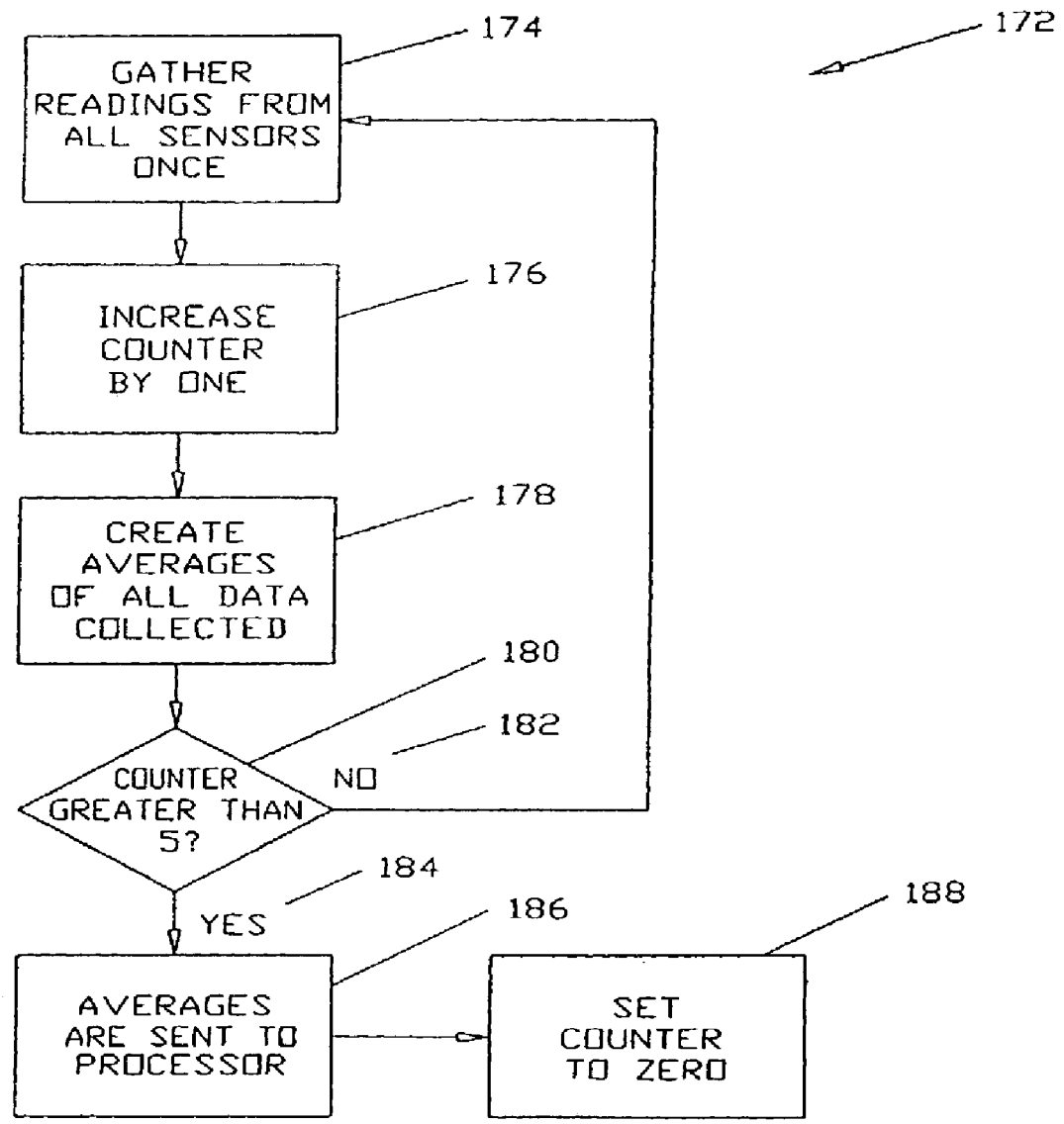
FIG. 6 is a flowchart showing a sequence of steps associated with a process for gathering data from the sensor/emitter pairs assembled in the seat bun.

In FIG. 6, a flowchart shows a process (172) associated with step (144) shown in FIG. 5 for the gathering of data from the sensor/emitter pairs (108). In step (174), a single reading is gathered from each sensor/emitter pair (108) employed. An internal counter is then incremented by one at step (176) to track the number of readings made. In step (178), an average is calculated for each sensor based on all the readings gathered thus far, according to the count number stored in the internal counter. A comparison is made at step (180) to determine if the internal counter has reached a predetermined number. The predetermined number "5" is used, in this example, to indicate the number of sensor readings that need to be taken and used to provide an average reading for each sensor. If the number of readings is determined to be less than the predetermined number at (182), the process is repeated and additional readings are taken starting at step (174) and progressing through step (180). When the comparison at step (180) indicates that the predetermined number of readings have been taken, the averaged readings for each sensor are provided to the processor at step (186). Then, step (148) in FIG. 5 is performed. Finally, in process (172) the internal counter is reset to zero at step (188) in anticipation of the next cycle of the procedure to gather sensor readings. This procedure of averaging the data over a predetermined number of cycles serves to minimize the effects of electromagnetic or other background interference that may impact the readings from the sensors/emitter pairs (108).

Figure 7:
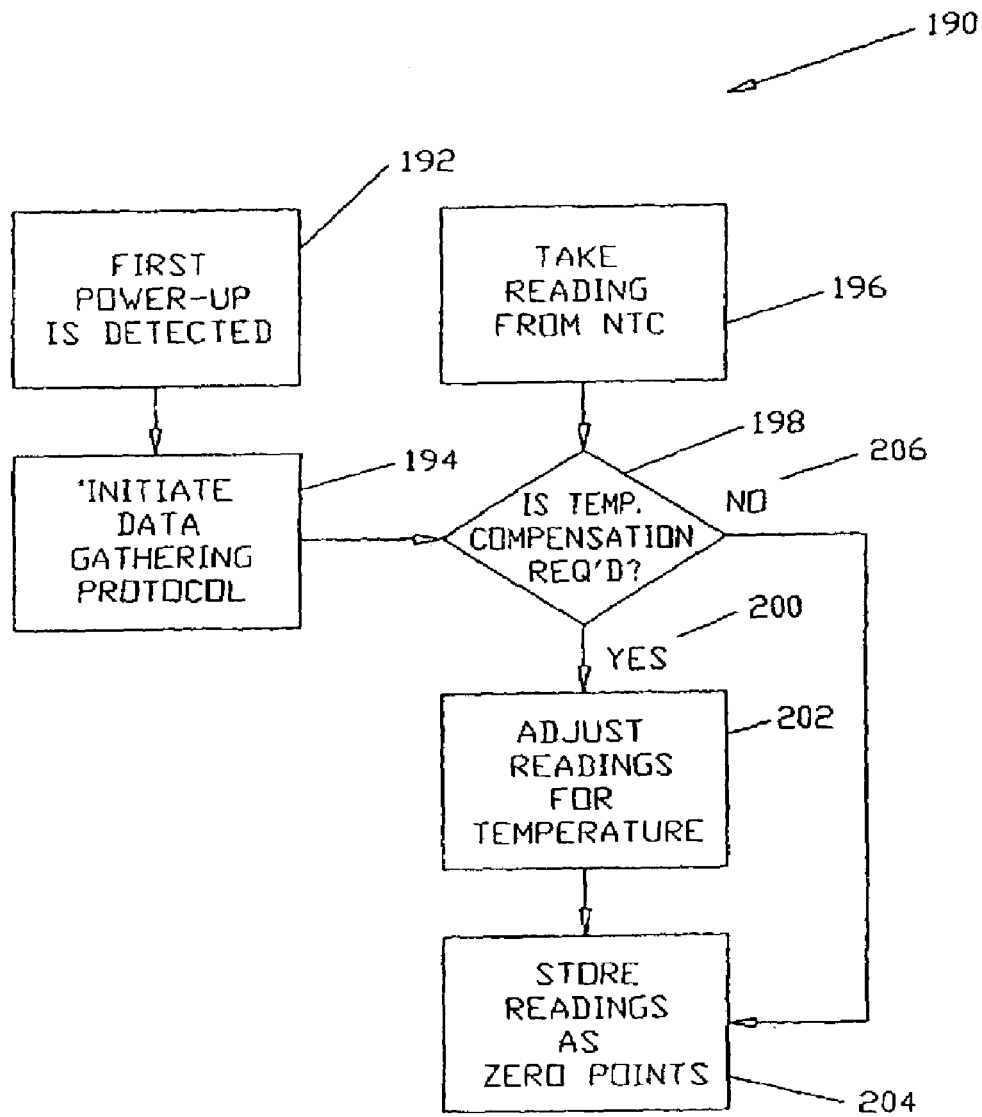
FIG. 7 is a flowchart showing a sequence of steps associated with initial system calibration, after assembly and preferably before installation in a vehicle.

In FIG. 7, the flowchart illustrates the initial power-up procedure (190) that is used to set the "zero" reference point for the signal readings from each sensor pair, after the sensors are installed in a seat cushion and preferably before the seat is installed in a vehicle. This is done with no load present on the seat cushion, in order to calculate the corresponding "zero" reading by each sensor pair. When initial power activates the system after installation and during the seat assembly procedure, the processor detects this as the first power-up at step (192). The processor responsively initiates the data gathering protocol at step (194), as described above in procedure (172). In addition, a reading is taken from the associated ambient temperature sensor NTC at step (196). At step (198) a check is made to determine if temperature compensation is required. If the ambient temperature is sensed as being above or below predetermined high and low values, compensation is called for in at (200). The processor compensates the averaged sensor readings gathered in (194) for temperature at step (202) according to a predetermined algorithm. The compensated sensor readings are then stored, as the corresponding "zero" points (204). If temperature compensation is not required at (206), and the averaged sensor readings gathered in step (194) are stored as the corresponding "zero" points (204). With the zero points stored during assembly, future readings of the signal outputs from the sensor pairs will be repeatable for the sensors installed in each seat.

Figure 8:
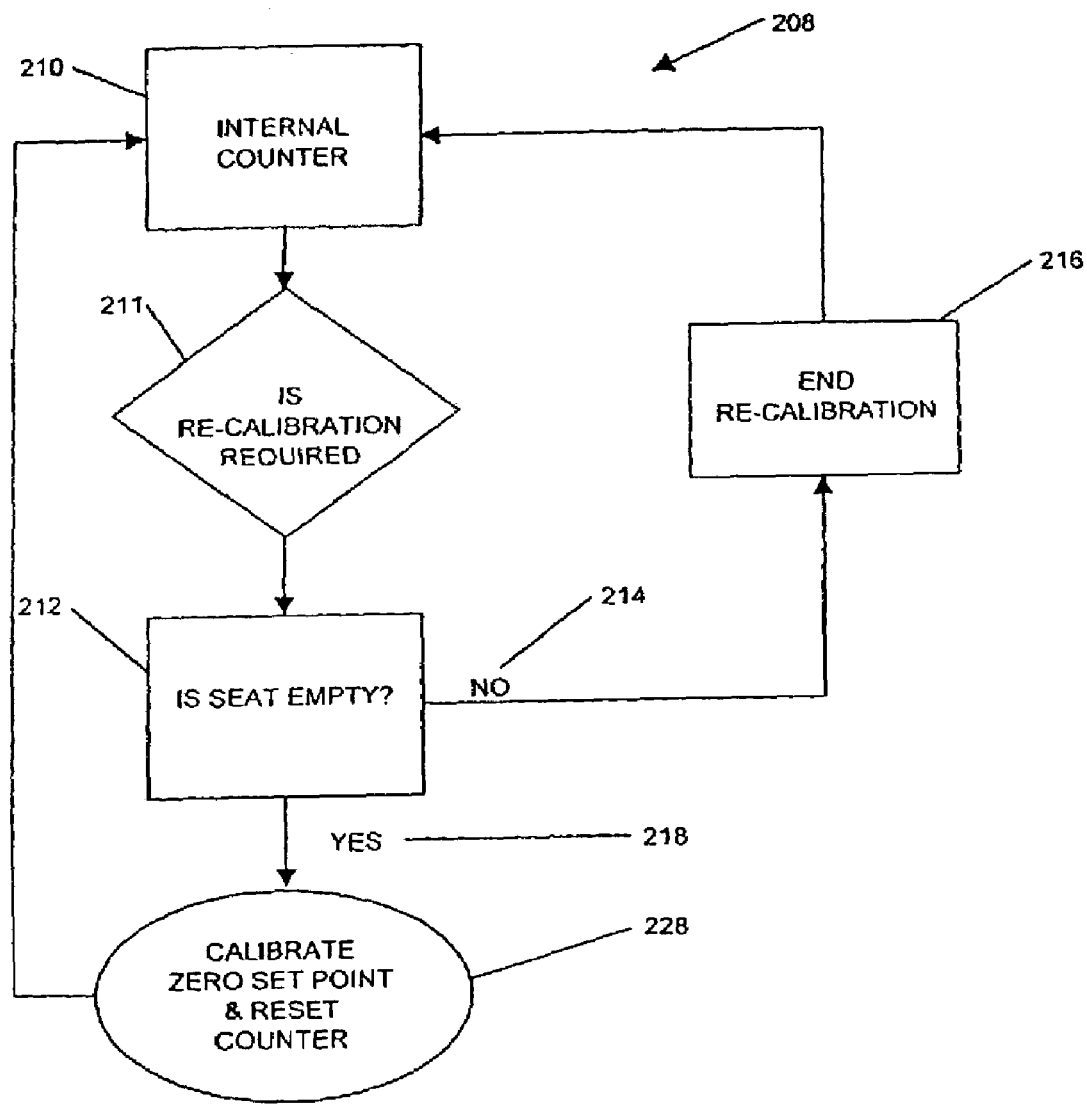
FIG. 8 is a flowchart showing a sequence of steps associated with the recalibration procedure for automatic recalibration of the sensor outputs at predetermined intervals.

Over the life of the system, it is anticipated that aging of the seat materials and sensors may require re-calibration of the zero points for one or more of the sensor pairs. In FIG. 8, a flow chart is used to show a re-calibration procedure (208), which is performed as a result of some timed event. In the present example, a predetermined number of vehicle ignition cycles is counted as the timed event. Alternatively, other events could be monitored, such as the number of sensed seat loads or a clock. In this example, the procedure (208) begins when a counter (210), within the system processor, reaches a predetermined number of ignition cycles as determined at step (211). The processor then determines if the seat is occupied or unoccupied at step (212). If the seat is determined to be empty at (218), an automatic re-calibration of all emitter/sensor pairs occurs (228). The re-calibration process is identical to the procedure (190) shown in FIG. 7. However, if the seat is determined to be occupied at (214), the processor ends the re-calibration immediately at step (216). The determination provided at (214) is used by the processor to remember that re-calibration did not occur and to try re-calibration again at the next ignition on cycle. This will repeatedly occur as many times as required until the processor determines that the seat is empty at an ignition cycle event.

Since people come in a wide range of shapes and sizes, the processor must be capable of recognizing patterns and generalizing them to yield correct output for any occupant. A learning system, such as a neural network system, is utilized to provide such functionality in the form of tables that are then referenced by the on-board system processor (114). The tables of values generated from the neural network in the learning system are referenced by the processor while applying an algorithm that simulates a neural network, and thereby requires less memory and processing power than an actual neural network processor would require.

A neural network simulation consists of two basic elements: nodes and connections. Nodes are additive, summing all values from connections entering the node and sending that value to the connections leaving the node. Connections are multiplicative, multiplying a value passing through a connection by the weight associated with it. The signals outputting the node are usually conditioned using a transfer function assisting the neural network in achieving desired nonlinear characteristics. To create the basic architecture for a neural network simulation, nodes and connections are usually arranged into conceptual "layers" of different sizes. The input layer receives the input from the source. Conversely, the output layer creates the output for the user. The size of the input layer and the output layer are determined by the desired amount of inputs and outputs. The hidden layers, so named because they are conceptually hidden from the outside of the network, determine the non-linearity and generalization capabilities of the network. By changing the size of the layers (i.e., their number), higher resolution and more detail of the pattern may be obtained, thereby allowing a wider variety of patterns/classes to be recognized.

Figure 9:
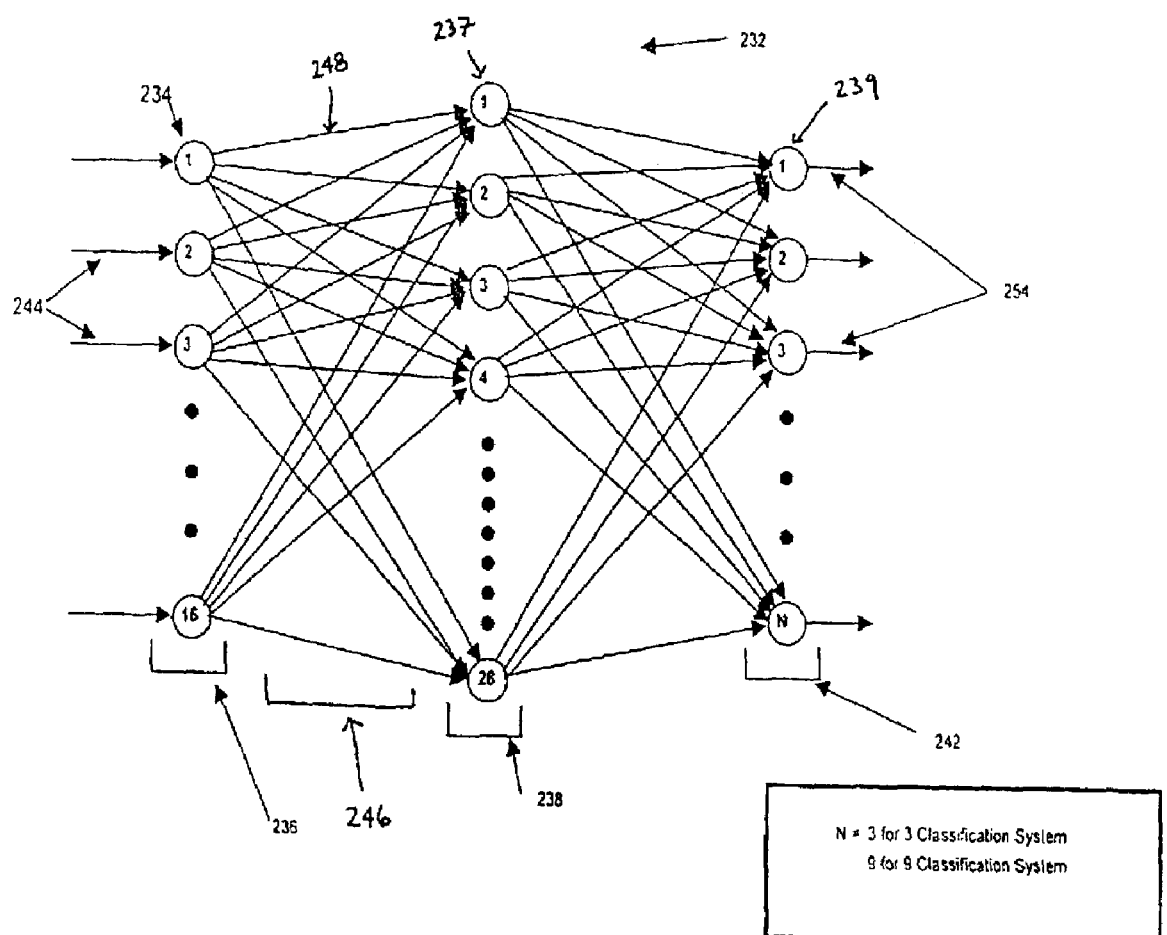
FIG. 9 is a block diagram of a neural network simulation.

Referring to FIG. 9, a block diagram (232) of a neural network is conceptually represented. In this example, the architecture of the network (232) contains sixteen individual nodes (234) in the input layer (236); twenty-eight individual nodes (237) in the hidden layer (238); and "N" nodes (239) in the output layer (242). Each node (234) in the input layer (236) receives a value at a corresponding input (244) from a respective one of an array of 16 sensor/emitter pairs (108). Each node (234) in the input layer (236) is connected to each node (237) in the hidden layer (238) with multiplicative connections (246) each being assigned a weight factor (248). Every node (237) in the hidden layer (236) is further connected to each node (239) in the output layer (242). Tables are prepared during the learning process and contain values that respectively correspond to the individual sensors and their respective readings. The tables are referenced by the processor in order to simulate the network (232) by multiplying and summing the readings according to its algorithm in order to provide an output that is indicative of predetermined classifications and categories of seat occupants, and according to the sensed weight distribution over the sensor array. The outputs (254) of the output layer (242) may then be used by the SDM to control the airbag deployment system. It is noted that this architecture is not the only available architecture for the simulated network (232). As seat buns become more complex and as a wider of variety of patterns is to be recognized, the size of the network (232) may grow and change.

It should be understood that the foregoing description of the embodiments is merely illustrative of many possible implementations of the present invention and is not intended to be exhaustive.

The invention claimed is:

1. A vehicle seat occupancy detection system comprising: a seat bun forming a portion of the seating cushion for an occupant's seat, wherein said seat bun has a substantially horizontal upper surface portion and a lower portion; a sensor device having first and second relatively movable parts being aligned for relative movement substantially perpendicular to said seat bun surfaces, said first part being mounted within said seat bun and spaced below said upper surface, said second part also being mounted within said seat bun and being spaced below said first part; said seat bun containing a cavity in which said sensor device is mounted and said second part being mounted on a support layer abutting said lower portion of said seat bun; said sensor device being operative to produce signals indicative of the distance between said first and second parts; and a processor for receiving said sensor signals and interpreting the signals to produce an output to indicate the presence of an occupant in said seat.

2. A vehicle seat occupancy detection system as in claim 1, wherein said sensor device is a Hall-effect sensor comprising a magnetic field emitter and a magnetic field sensor.

3. A vehicle seat occupancy detection system as in claim 2, wherein said first part comprises said magnetic field emitter and said second pan comprises said magnetic field sensor.

4. A vehicle seat occupancy detection system comprising: a seat bun forming a portion of the seating cushion for an occupant's seat, wherein said seat bun has a substantially horizontal upper surface portion and a lower portion; a sensor device having first and second relatively movable parts being aligned for relative movement substantially perpendicular to said seat bun surfaces, said first part being mounted within said seat bun and spaced below said upper surface, said second part also being mounted within said seat bun and being spaced below said firs part; said seat bun containing a plurality of cavities arrayed in a predetermined pattern and a plurality of sensor devices being mounted within said cavities for producing signals; said sensor devices being operative to produce signals indicative of the distance between said first and second parts; a processor for receiving said sensor signals and interpreting the signals to produce an output to indicate the presence of an occupant in said seat; and said processor receiving and interpreting the signals from each sensor device to produce an output corresponding with the weight and pattern of a load applied to the upper surface portion of said seat bun.

5. A vehicle seat occupancy detection system as in claim 4, wherein said sensor device comprises Hall-effect sensors which each include a magnetic field emitter and a magnetic field sensor.

6. A vehicle seat occupancy detection system as in claim 1, wherein said sensor device includes a compressible housing that encloses first and second parts of said sensor device and said housing is adapted for mounting into said cavity.

7. A vehicle seat occupancy detection system as in claim 6, wherein said sensor device includes a guard device located between said first and second parts to prevent said first and second parts from coming in direct contact with each other.

8. A vehicle seat occupancy detection system as in claim 7, wherein said guard device includes an alignment portion which guides said first part into a predetermined alignment with said second part.

9. A vehicle seat occupancy detection system as in claim 6, wherein said compressible housing is formed to limit the amount of relative movement between the first and second parts and prevent said first and second parts from coming in direct contact with each other.

10. A vehicle seat occupancy detection system as in claim 9, wherein said compressible housing includes an alignment portion which guides said first part along a predetermined liner path with respect to said second part.

11. A vehicle seat occupancy detection system as in claim 6, wherein said compressible housing is formed of a material that restores said first and second parts to a separated distance when no load is applied to said seat bun.

12. In a vehicle seat occupancy detection system that includes a seat for an occupant: a seating cushion for an occupant's seat, having a substantially horizontal upper surface portion and a lower portion; a sensor device having first and second relatively movable parts being aligned for relative movement substantially perpendicular to said seat cushion surfaces, said first part being mounted within said seat cushion and spaced below said upper surface, said second part also being mounted within said seat cushion and being spaced below said first part; said seat cushion containing a cavity in which said sensor device is mounted and said second part being mounted on a support layer abutting said lower portion of said seat cushion; said sensor device being operative to produce signals indicative of the distance between said first and second parts; and a processor for receiving said sensor signals and interpreting the signals to produce an output to indicate the presence of an occupant in said seat.

13. A vehicle seat occupancy detection system as in claim 12, wherein said sensor device is a effect sensor comprising a magnetic field emitter and a magnetic field sensor.

14. A vehicle seat occupancy detection system as in claim 13, wherein said first part comprises said magnetic field emitter and said second part comprises said magnetic field sensor.

15. A vehicle seat occupancy detection system as in claim 12, wherein said sensor device includes a compressible housing that encloses first and second parts of said sensor device and said housing is adapted for mounting into said cavity.

16. A vehicle seat occupancy detection system as in claim 15, wherein said sensor device includes a guard device located between said first and second parts to prevent said first and second parts from coming in direct contact with each other.

17. A vehicle seat occupancy detection system as in claim 16, wherein said guard device includes an alignment portion which guides said first part into a predetermined alignment with said second part.

18. A vehicle seat occupancy detection system as in claim 15, wherein said compressible housing is formed to limit the amount of relative movement between the first and second parts and prevent said first and second parts from coining in direct contact with each other.

19. A vehicle seat occupancy detection system as in claim 18, wherein said compressible housing includes an alignment portion which guides said first part along a predetermined linear path with respect to said second part.

20. A vehicle seat occupancy detection system as in claim 15, wherein said compressible housing is formed of a material that restores said first and second parts to a separated distance when no load is applied to said seat cushion.

21. A vehicle seat occupancy detection system that includes a seat for an occupant:
   a seating cushion for an occupant's seat, having a substantially horizontal upper surface portion and a lower portion;
   a sensor device having first and second relatively movable parts being aligned for relative movement substantially perpendicular to said seat cushion surfaces, said first part being mounted within said seat cushion and spaced below said upper surface, said second part also being mounted within said seat cushion and being spaced below said first part; said seat cushion containing a plurality of cavities arrayed in a predetermined pattern and a plurality of sensor devices mounted within said cavities for producing signals; said sensor device being operative to produce signals indicative of the distance between said first and second parts;
   a processor for receiving said sensor signals and interpreting the signals to produce an output to indicate the presence of an occupant in said seat; and said processor receiving and interpreting the signals from each sensor device to produce an output corresponding with the weight and pattern of a load applied to the upper surface portion of said seat cushion.

22. A vehicle seat occupancy detection system as in claim 21, wherein said sensor device comprise Hall-effect sensors which each include a magnetic field emitter and a magnetic field sensor.

23. A vehicle seat occupancy detection system as in claim 21, wherein said processor receives the signals from each sensor device a plurality of times, averages the received signal values from each sensor over said plurality of times, and analyzes said averaged signal values with an algorithm simulating a neural network to produce an output corresponding with the weight and pattern of a load applied to the upper surface portion of said seat cushion.

24. A vehicle seat occupancy detection system as in claim 23, wherein said processor also compensates said received signal values for ambient temperature conditions according to predetermined compensation values for each value of temperature, and analyzes said averaged and compensated signal values with an algorithm simulating a neural network to produce an output corresponding with the weight and pattern of a load applied to the upper surface portion of said seat cushion.

25. A method of detecting an occupant in a seat comprising the steps of:
   providing a seating cushion having a substantially horizontal upper surface portion function as an occupant's seating surface and a lower portion with an outer surface in substantial opposition to said upper surface; providing a cavity in said seat and a support layer abutting said lower portion; providing a weight sensor device having first and second relatively movable parts aligned for relative movement substantially perpendicular to said seat cushion surfaces, wherein said sensor device is operative to produce signals indicative of the distance between said first and second parts; mounting said first part of said sensing device internal to said seat cushion spaced below said upper surface in said cavity;
   mounting said second part of said sensing device below said first part on said supporting surface abutting said lower portion; and providing a means for receiving said sensor signals and interpreting said signals to produce an output to indicate the presence of an occupant in said seat.

26. A method of detecting an occupant in a seat comprising the steps of:
   providing a seating cushion having a substantially horizontal upper surface portion function as an occupant's seating surface and a lower portion with an outer surface in substantial opposition to said upper surface;
   providing a plurality of cylindrical cavities in said seat that extend from the lower surface towards the upper surface in sufficient size to accommodate and accept a corresponding plurality of weight sensor devices, said weight sensor devices each having first and second relatively movable parts aligned for relative movement substantially perpendicular to said seat cushions surfaces; inserting said weight sensing devices into said cavities; providing a substrate to support said weight sensing devices and attaching said substrate to the lower surface of said seat cushion, said sensor devices being operative to produce signals indicative of the distance between said first and second parts and providing a means for receiving said sensor signals and interpreting said signals to produce an output to indicate the presence of an occupant in said seat.

27. A method as in claim 26, wherein said step of providing a means for receiving and interpreting said sensor signals, includes the steps of determining the "zero" position of each sensor when no load is present on said seat cushion.

28. A method as in claim 27, wherein said step of providing a means for receiving and interpreting said sensor signals, includes the steps of initially determining the "zero" position of each sensor when no load is present on said seat cushion and periodically determining the "zero" position of each sensor thereafter.

29. A method as in claim 26, further including the step of sensing ambient temperature in the area of the seat location and wherein said steps of reading and interpreting said sensor signals includes averaging the output signals from each of the sensors and compensating such averaged values for extreme ambient temperatures when such extreme temperatures are sensed.

* * * * *